(12) United States Patent
Yokoyama

(10) Patent No.: US 8,147,331 B2
(45) Date of Patent: Apr. 3, 2012

(54) VIDEO GAME PROGRAM, VIDEO GAME DEVICE, AND VIDEO GAME METHOD

(75) Inventor: Yuichi Yokoyama, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 1563 days.

(21) Appl. No.: 10/595,163

(22) PCT Filed: Sep. 7, 2004

(86) PCT No.: PCT/JP2004/012972
§ 371 (c)(1),
(2), (4) Date: Mar. 13, 2006

(87) PCT Pub. No.: WO2005/025705
PCT Pub. Date: Mar. 24, 2005

(65) Prior Publication Data
US 2006/0287023 A1    Dec. 21, 2006

(30) Foreign Application Priority Data
Sep. 12, 2003  (JP) ................................ 2003-321218

(51) Int. Cl.
*A63F 13/12*  (2006.01)
(52) U.S. Cl. .................. 463/36; 463/4; 463/23; 463/30; 463/37; 273/317.1; 273/317.3; 273/317.5; 273/317.6; 340/323 B; 377/5; 473/451; 473/468
(58) Field of Classification Search .................. 463/1–9, 463/20, 23, 25, 30–32, 34, 36–37, 40–43, 463/46–47, 50, 53, 56; 273/108.1, 108.3, 273/108.4, 118 R, 150, 244, 244.1, 247, 259, 273/317.1, 317.3, 317.4, 317.5, 317.6, 359, 273/406, 440.1, 460–461; 340/323 R, 323 B; 377/4–5; 446/415; 473/451, 468, 498–499, 473/504, 564–565, 598, 600, FOR. 102, FOR. 135, 473/FOR. 169, FOR. 192; *A63F 13/12*
See application file for complete search history.

(56) References Cited

U.S. PATENT DOCUMENTS
3,749,514 A * 7/1973 Kelch et al. ..................... 416/95
(Continued)

FOREIGN PATENT DOCUMENTS
EP       1-116-505 A2     7/2001
(Continued)

OTHER PUBLICATIONS

EA Sports, "Tiger Woods PGA Tour 2004" Manual, (Sep. 22, 2003) [PDF attached].*

(Continued)

*Primary Examiner* — Arthur O. Hall
(74) *Attorney, Agent, or Firm* — Global IP Counselors, LLP

(57) ABSTRACT

A video game player can control the movement of a moving object in a video game during a moving object dispatch operation by a character, thereby allowing the video game player to experience nervousness and a sense of realism when causing the character to dispatch the moving object. This video game program includes a first request receiving function, a operation display function, a second request receiving function, a moving object control function, and a moving object display function. In the video game implemented with this program, a dispatch request for dispatching the moving object is received from the controller in the second request receiving function when the dispatch operation of the character is displayed on the monitor. According to the timing at which the second request receiving function received the dispatch request, the movement of the moving object is controlled in the moving object control function.

11 Claims, 5 Drawing Sheets

U.S. PATENT DOCUMENTS

| | | | | |
|---|---|---|---|---|
| 5,118,105 A * | 6/1992 | Brim et al. | | 473/58 |
| 5,269,519 A * | 12/1993 | Malone | | 473/154 |
| 5,435,554 A * | 7/1995 | Lipson | | 463/3 |
| 5,769,713 A * | 6/1998 | Katayama | | 463/3 |
| 5,816,953 A * | 10/1998 | Cleveland | | 473/459 |
| 6,120,374 A * | 9/2000 | Akada et al. | | 463/3 |
| 6,149,520 A * | 11/2000 | Takatsuka | | 463/4 |
| 6,217,444 B1 * | 4/2001 | Kataoka et al. | | 463/3 |
| 6,244,956 B1 * | 6/2001 | Nakayama et al. | | 463/3 |
| 6,254,492 B1 * | 7/2001 | Taggett | | 473/219 |
| 6,257,983 B1 * | 7/2001 | Rimoto | | 463/38 |
| 6,371,849 B1 * | 4/2002 | Togami | | 463/4 |
| 6,394,894 B1 * | 5/2002 | Okitsu et al. | | 463/3 |
| 6,394,896 B2 * | 5/2002 | Sugimoto | | 463/3 |
| 6,461,237 B1 * | 10/2002 | Yoshinobu et al. | | 463/3 |
| 6,482,090 B1 * | 11/2002 | Rimoto et al. | | 463/31 |
| 6,494,783 B2 * | 12/2002 | Namba et al. | | 463/3 |
| 6,503,144 B1 * | 1/2003 | Rimoto et al. | | 463/4 |
| 6,626,756 B2 * | 9/2003 | Sugimoto | | 463/4 |
| 7,033,269 B2 * | 4/2006 | Namba et al. | | 463/3 |
| 7,063,616 B2 * | 6/2006 | Kuri | | 463/4 |
| 7,270,601 B2 * | 9/2007 | Takahashi et al. | | 463/3 |
| 2001/0044333 A1 * | 11/2001 | Okishio et al. | | 463/3 |
| 2002/0016194 A1 * | 2/2002 | Namba et al. | | 463/3 |
| 2002/0016195 A1 * | 2/2002 | Namba et al. | | 463/3 |
| 2002/0107058 A1 * | 8/2002 | Namba et al. | | 463/3 |
| 2002/0177477 A1 * | 11/2002 | Okitsu et al. | | 463/3 |
| 2003/0003977 A1 * | 1/2003 | Takahashi et al. | | 463/3 |
| 2003/0017863 A1 * | 1/2003 | Takahashi et al. | | 463/3 |
| 2003/0040349 A1 * | 2/2003 | Imaeda et al. | | 463/3 |
| 2003/0078086 A1 * | 4/2003 | Matsuyama et al. | | 463/3 |
| 2005/0153764 A1 * | 7/2005 | Sterchi et al. | | 463/3 |
| 2006/0276241 A1 * | 12/2006 | Toyohara et al. | | 463/4 |
| 2006/0287023 A1 * | 12/2006 | Yokoyama | | 463/3 |

FOREIGN PATENT DOCUMENTS

JP    2001/129249 A    5/2001

OTHER PUBLICATIONS

Tiger Woods PGA Tour 2004 perfect shot video, http://www.youtube.com/watch?v=472vwIQGITw, retrieved Jun. 21, 2009 [No PDF Attached].*

European Search Report of corresponding European Patent Application No. 04787676.8-1241/1666107, dated on Aug. 1, 2001.

* cited by examiner

VIDEO GAME PROGRAM, VIDEO GAME DEVICE, AND VIDEO GAME METHOD

TECHNICAL FIELD

The present invention relates to a video game program, particularly a video game program for implementing a video game on a computer, and which can execute a game with a controller in which a character and a moving object are displayed on a monitor and the moving object is dispatched by a character. Furthermore, the present invention relates to a video game device and a video game method implemented with this video game program.

BACKGROUND ART

Various video games have been proposed in the past. One such game is a competitive video game, such as a baseball video game, wherein characters and moving objects are displayed on a monitor and competitive sports are carried out. This type of baseball video game includes a game in which a person playing the video game will operate the player characters on his or her own team with a controller and score points against another team, a game in which the game itself is primarily operated automatically and the video game player enjoys the game from the position of a team manager, and the like. With the former game, the video game player's own team will engage in offense and defense by operating the player characters with the controller so as to cause them to hit and throw the ball. In particular, when a player character is the pitcher, the video game player will cause the pitcher character to throw the ball to the catcher character simply by indicating the destination of the ball (the position of the catcher character's mitt) and the type of pitch to be thrown with the controller. The ball control by the pitcher character at this time is automatically determined according to the throwing ability of the pitcher character, the type of pitch specified by the video player, and the like.

DISCLOSURE OF THE INVENTION

In conventional video games, such as baseball video games, for example, when a video game player operates the player characters of his or her own team with a controller in order to scores point against another team, he or she will cause the pitcher character to automatically throw the ball to the catcher character simply by indicating the ball destination of the ball and the start of the pitch with the controller. Ball control by the pitcher character at this time is automatically determined according to the throwing ability of the pitcher character, the type of pitch specified by the video game player, and the like. Therefore, variations in ball control, such as the displacement of the ball at the destination and missing the destination, which can occur with the throwing operation of the pitcher character, are not taken into consideration in conventional baseball video games. For this reason, the video game player cannot experience a sufficient degree of nervousness and a sense of realism when causing the pitcher character to throw the ball.

An object of this invention is to enable a video game player to experience nervousness and a sense of realism when causing a video game character to dispatch a moving object, by making it possible to control the movement of the moving object during the video game character's moving object dispatch operation.

A first aspect of the present invention is a video game program for causing a computer to implement a video game that can be executed by means of a controller, in which a character and a moving object are displayed on a monitor, and the moving object is dispatched by the character, the video game program comprising:

(1) A first request receiving function that receives an operation initiation request from the controller in order to cause the character to initiate a dispatch operation up to the point of dispatching the moving object.

(2) An operation display function that displays the dispatch operation of the character on the monitor when the first request receiving function receives the operation initiation request.

(3) A second request receiving function that receives a request to dispatch the moving object from the controller when the dispatch operation of the character is displayed on the monitor by the operation display function.

(4) A moving object control function that controls the movement of the moving object according to the timing at which the second request receiving function received the dispatch request.

(5) A moving object display function that displays the moving object controlled by the moving object control function on the monitor.

In a video game implemented with this program, the first request receiving function causes the character to initiate the dispatch operation up to the point at which the moving object is dispatched by the first request receiving function. The dispatch operation of the character is displayed on the monitor in the operation display function. When the dispatch operation of the character is thus displayed on the monitor, a request to dispatch the moving object is received from the controller in the second request receiving function, whereupon the movement of the moving object is controlled by the moving object control function, according to the timing at which the second request receiving function received the dispatch request. The moving object, for which the movement is controlled by the moving object control function, is then displayed on the monitor by the moving object display function.

When the dispatch operation of the character is displayed on the monitor, the request to dispatch the moving object is received from the controller by the second request receiving function. The movement of the moving object is then controlled by the moving object control function in accordance with the timing at which the second request receiving function received the dispatch request. Thereby, the video game player can control the movement of the moving object during the character's moving object dispatch operation, and can experience nervousness and a sense of realism when causing the character to dispatch a moving object.

The video game program according to a second aspect of the present invention further implements a third request receiving function with the computer in the video game program according to the first aspect. The third request receiving function receives a destination indicating request and trajectory properties specifying request from the controller, in order to indicate the destination and specify the trajectory properties of the moving object up to the destination, before the first request receiving function receives an operation initiation request. At this point, the moving object control function controls the movement of the moving object according to the destination indicating request and trajectory properties specifying request received by the third request receiving function. In this case, the moving object control function controls the movement of the moving object according to the destination indicating request and the trajectory properties specifying request of the third request receiving function, before the first request receiving function receives the operation initiation request, as well as according to the timing at which the second request receiving function received the dispatch request. Thereby, the video game player can control the movement of the moving object even before the character's moving object dispatch operation, as well as during the character's moving object dispatch operation, and the nervousness and sense of realism felt at the time the video game player causes the character to dispatch the moving object can be increased.

The video game program according to a third aspect of the present invention further implements a dispatch ability storing function with the computer in the video game program according to the first or second aspects. The dispatch ability storing function stores dispatch ability information for the character. At this point, the moving object control function references the dispatch ability information stored by the dispatch ability storing function and controls the movement of the moving object. In this case, the movement of the moving object is controlled according to the dispatch ability information for each character. Thereby, the video game player can experience a different nervousness and sense of realism for each character, when the moving object is dispatched from a character.

The video game program according to a fourth aspect of the present invention is the video game program of any one of the first to third aspects, in which the moving object control function establishes the extent of the displacement of the moving object at the destination of the moving object, and controls the movement of the moving object, in accordance with the dispatch position of the moving object at the character at the time at which the second request receiving function has received the dispatch request. In this case, the moving object control function establishes the extent of the displacement of the moving object at the destination of the moving object, and controls the movement of the moving object, in accordance with the dispatch position of the moving object at the character. Thereby, the video game player can control the movement of the moving object when the character dispatches the moving object, and the nervousness and sense of realism that the player experiences when causing the character to dispatch the moving object can be increased.

The video game program according to a fifth aspect of the present invention further implements a first timing display function on the computer in the video game program according to any one of the first to fourth aspects. The first timing display function displays a timing indicator showing the timing of the dispatch of the moving object, after the first request receiving function has received the operation initiation request. In this case, the timing for dispatching the moving object can be determined with the timing indicator, by means of the first timing display function. Thus, the timing indicator allows the video game player to experience nervousness as a result of determining the timing for dispatching the moving object while watching the timing indicator change constantly over time.

The video game program according to a sixth aspect of the present invention is the video game program according to the fifth aspect, in which the timing indicator is displayed in conjunction with the dispatch operation of the character. In this case, the timing indicator is displayed in conjunction with the dispatch operation of the character, and thus the video game player can experience nervousness and a sense of realism when dispatching the moving object from the character due to the timing indicator and the dispatch operation of the character.

The video game program according to the seventh aspect of the present invention further implements a second timing display function with the computer in the video game program according to any one of the first to sixth aspects. The second timing display function displays the favorable or unfavorable results of the timing when the moving object was dispatched, by way of text or an image. In this case, in the second timing display function, the favorable or unfavorable results of timing when the moving object was dispatched are displayed with text or an image. Thereby, the video game player can confirm the favorable or unfavorable results of the timing when the moving object was dispatched, by way of the text or image. In addition, the video game player can experience a sense of realism when the moving object is dispatched from a character due to the favorable or unfavorable results of the timing when the moving object is dispatched.

The video game program according to the eighth aspect of the present invention is the video game program according to any one of the first to seventh aspects, in which the speed of the moving object is determined by means of controller operations from when the first request receiving function receives an operation initiation request until the second request receiving function receives a dispatch request. In this case, the speed of the moving object can be determined by operating the controller from when the first request receiving function receives the operation initiation request until the second request receiving function receives the dispatch request. Thus, the video game player can control the movement of the moving object during the character's moving object dispatch operation, and can experience nervousness and a sense of realism when the character dispatches the moving object.

A video game device according to a ninth aspect of the present invention is a device which can execute, by means of a controller, a video game in which a character and a moving object are displayed on a monitor, and a moving object is dispatched by a character.

This video game device comprises first request receiving means for receiving operation initiation requests from a controller in order to cause a character to initiate a dispatch operation up to the point of dispatching of a moving object; operation displaying means for displaying on a monitor the dispatch operation of the character when the first request receiving means has received the operation initiation request; second request receiving means for receiving the dispatch request of the moving object from the controller when the dispatch operation of the character is displayed on the monitor by the operation displaying means; moving object controlling means for controlling the movement of the moving object according to the timing at which the second request receiving means received the dispatch request; and moving object displaying means for displaying the moving object on a monitor, the movement of the moving object controlled by the moving object controlling means.

The video game method according to a tenth aspect of the present invention is a method which can execute, by means of a controller, a game in which a character and a moving object are displayed on a monitor, and a moving object is dispatched by a character.

This video game method comprises a first request receiving step for receiving operation initiation requests from a controller in order to cause a character to initiate a dispatch operation up to the point of dispatching a moving object; an operation displaying step for displaying the dispatch operation of the character on a monitor when the first request receiving step has received the operation initiation request; a second request receiving step for receiving the dispatch request of the moving object from the controller when the dispatch operation of the character is displayed on the monitor by the operation displaying step; a moving object controlling step for controlling the movement of the moving object according to the timing at which the second request receiving step received the dispatch request; and a moving object displaying step for displaying the moving object on the monitor, the movement of the moving object controlled by the moving object controlling step.

PREFERRED EMBODIMENTS OF THE INVENTION

Constitution and Operation of the Video Game Device

Figure 1:
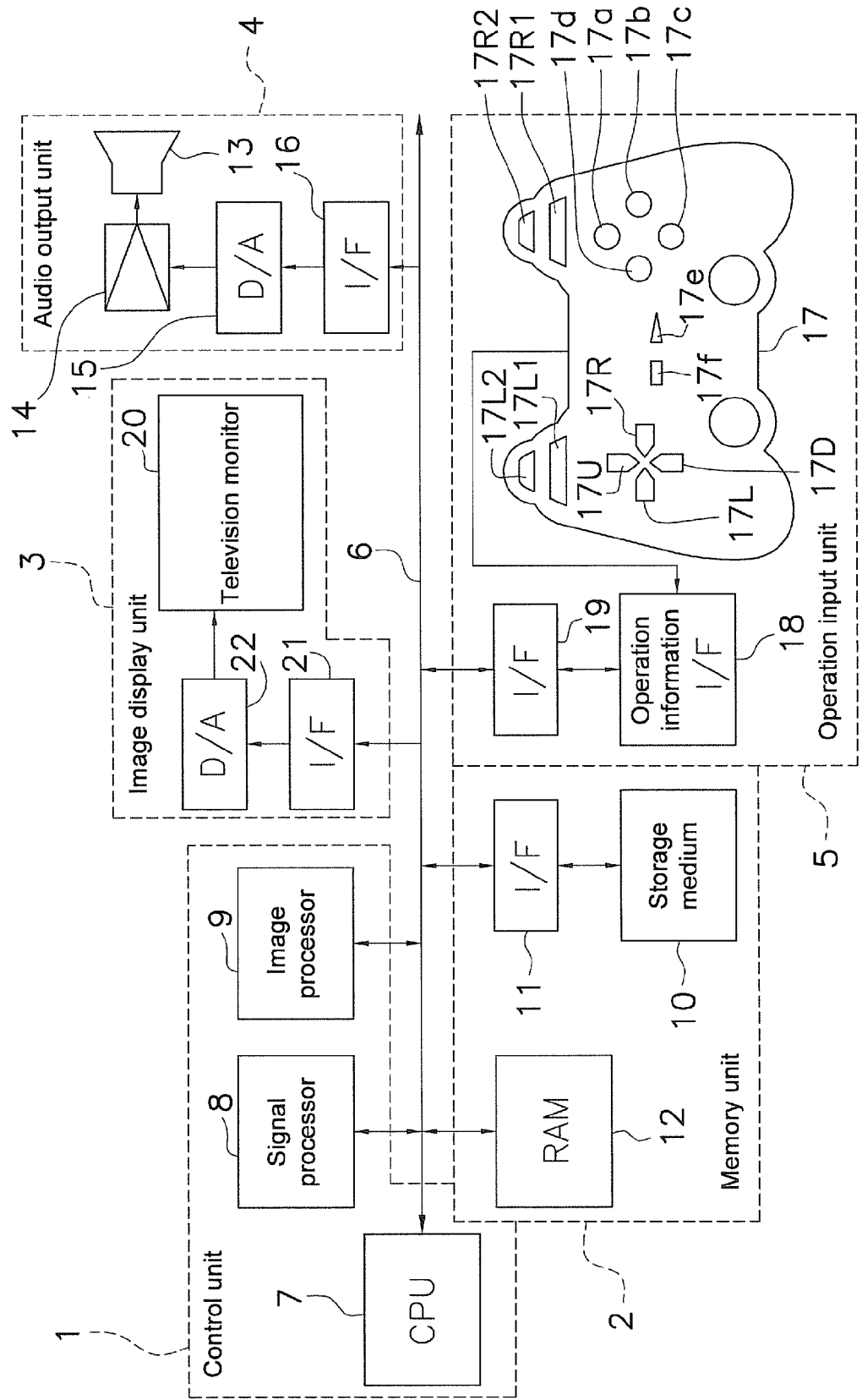
FIG. 1 is basic schematic view of a video game device according to one embodiment of the present invention.

FIG. 1 shows the basic constitution of a video game device according to one embodiment of the present invention. This description uses a home video game device as an example of a video game device. The home video game device comprises a home game device unit and a home television. A recording medium 10 can be loaded in the home game device unit, and game data is appropriately read from the recording medium 10 and a game is executed. The contents of the game executed in this way are displayed on the home television.

The game system of the home video game device comprises a control unit 1, a storage unit 2, an image display unit 3, an audio output unit 4, and an operation input unit 5, each of which is connected over the bus 6. This bus 6 includes an address bus, a data bus, a control bus, and the like. The control unit 1, the storage unit 2, the audio output unit 4, and the operation input unit 5 are included in the home game device unit of the home video game device, and the image display unit 3 is included in the home television.

The control unit 1 is provided mainly to control the progress of the entire game based on the game program. The control unit 1 comprises a CPU (Central Processing Unit) 7, a signal processor 8, and an image processor 9, for example. The CPU 7, the signal processor 8, and the image processor 9 are each connected together over the bus 6. The CPU 7 interprets commands from the game program and performs various types of data processing and control. For example, the CPU 7 commands the signal processor 8 to provide image data to the image processor. The signal processor 8 mainly performs computations in three-dimensional space, position conversion computations from three-dimensional space to an artificial three-dimensional space, light source computation processing, and the generation and processing of image and audio data. The image processor 9 mainly performs processing to write image data to be rendered to the RAM 12 based on the computation results and processing results of the signal processor 8.

The storage unit 2 is provided mainly to store program data, various types of data used in program data, and the like.

The storage unit 2 comprises a recording medium 10, an interface circuit 11, and RAM (Random Access Memory) 12, for example. The interface circuit 11 is connected to the recording medium 10. The interface circuit 11 and RAM 12 are then connected via the bus 6. The recording medium 10 is for storing program data for the operating system, game data comprising image data, audio data, and various types of program data, and the like. For example, this recording medium 10 is a ROM (Read Only Memory) cassette, optical disk, flexible disk, or the like on which program data for the operating system, game data, and the like are recorded. Note that the recording medium 10 also encompasses card-type memory; this card-type memory is mainly used to store various game parameters at the point of interruption when the game is interrupted. The RAM 12 is used to temporarily store various types of data read from the recording medium 10, and to temporarily record processing results from the control unit 1. In addition to various types of data, address data showing the memory location of various types of data is stored in this RAM 12, and it is possible to specify and read and write to any address.

The image display unit 3 is provided mainly to output, as images, image data written to the RAM 12 by the image processor 9, image data read from the recording medium 10, and the like. The image display unit 3 comprises a television monitor 20, an interface circuit 21, and a D/A converter (Digital-to-Analog converter) 22, for example. The D/A converter 22 is connected to the television monitor 20 and the interface circuit 21 is connected to the D/A converter 22. The bus 6 is then connected to the interface circuit 21. Here, image data is provided to the D/A converter 22 via the interface circuit 21, and is there converted to an analog image signal. The analog image signal is output as an image by the television monitor 20.

This image data includes polygon data, texture data, and the like, for example. Polygon data is coordinate data for vertices that constitute a polygon. Texture data is directed at providing texture to the polygon, and comprises texture indicating data and texture color data. The texture indicating data is data for linking a polygon and texture, and texture color data is data for specifying the color of the texture. Here, polygon address data and texture address data, showing the memory location of each type of data, are linked to the polygon data and texture data. With such image data, the signal processor 8 performs coordinate conversion and perspective projection conversion, based on the distance data and rotation data of the screen itself (point of view), for the polygon data in three-dimensional space (three-dimensional polygon data) shown by the polygon address data, and replaces the three-dimensional polygon data with polygon data in two-dimensional space (two-dimensional polygon data). A polygon outline is constituted with a plurality of two-dimensional polygon data, and texture data specified by the texture address data is written to the interior of the polygon. In this way, objects with texture applied to each polygon can represent, for example, a coach character, a player character, a referee character, a ball character, and the like.

The audio output unit 4 is provided mainly for output as audio data read from the recording medium 10. The audio output unit 4 comprises a speaker 13, an amplifier circuit 14, a D/A converter 15, and an interface circuit 16, for example. The amplifier circuit 14 is connected to the speaker 13; the D/A converter 15 is connected to the amplifier circuit 14; and the interface circuit 16 is connected to the D/A converter 15. The bus 6 is then connected to the interface circuit 16. Here, the audio data is provided to the D/A converter 15 via the interface circuit 16 and is converted to an analog audio signal.

This analog audio signal is amplified by the amplifier circuit 14 and output from the speaker 13 as sound. Audio data includes, for example, ADPCM (Adaptive Differential Pulse Code Modulation) data, PCM (Pulse Code Modulation) data, and the like. In the case of ADPCM data, the sound can be output from the speaker 13 with the same type of processing method as described above. In the case of PCM data, the PCM data are converted to ADPCM data in the RAM 12, and the sound can be output from the speaker 13 with the same type of processing method as described above.

The operation input unit 5 primarily comprises a controller 17, an operation information interface circuit 18, and an interface circuit 19. The operation information interface circuit 18 is connected to the controller 17; and the interface circuit 19 is connected to the operation information interface circuit 18. The bus 6 is then connected to the interface circuit 19.

The controller 17 is an operation device used for the player to input various operation commands and sends operation signals to the CPU 7 according to player operations. The following are provided on the controller 17: a first button 17a, a second button 17b, a third button 17c, a fourth button 17d, an up key 17U, a down key 17D, a left key 17L, a right key 17R, an L1 button 17L1, an L2 button 17L2, an R1 button 17R1, an R2 button 17R2, a start button 17e, a select button 17f, a left stick 17SL, and a right stick 17SR.

The up key 17U, the down key 17D, the left key 17L, and the right key 17R are used to provide to the CPU 7 commands to cause the characters and cursor to move up, down, left, and right on the screen of the television monitor 20, for example.

The start button 17e is used when indicating to the CPU 7 to load the game program from the recording medium 10, or the like.

The select button 17f is used when indicating various selections to the CPU 7, and the like, for the game program loaded from the recording medium 10.

The left stick 17SL and the right stick 17SR are stick-shaped controllers having approximately the same constitution as a so-called joystick. The stick-shaped controller comprises an upright stick. This stick is inclinable, with a range of 360 degrees, including forward, back, left, and right, from the upright position centered on a fulcrum. The left stick 17SL and right stick 17SR send x and y coordinate values with the origin being the upright position, according to the direction and angle of inclination of the stick, as an operation signal to the CPU 7 via the operation information interface circuit 18 and interface circuit 19.

According to the game program loaded from the recording medium 10, various functions are allocated to the first button 17a, the second button 17b, the third button 17c, the fourth button 17d, the L1 button 17L1, the L2 button 17L2, the R1 button 17R1, and the R2 button 17R2.

Note that each button and each key on the controller 17, excluding the left stick 17SL and the right stick 17SR, are ON/OFF switches which turn ON when depressed from the neutral position with the application of external pressure, and turn OFF upon returning to the neutral position when the pressure is released.

The general operation of the home video game device with the constitution discussed above is described below. When the power switch (not shown) is turned on and the game system 1 is powered up, the CPU 7 reads image data, audio data, and program data from the recording medium 10, based on the operating system stored in the recording medium 10. All or part of the image data, audio data, and program data read is stored in the RAM 12. Then, the CPU 7 issues commands for the image data and audio data stored in the RAM 12, based on the program data stored in the RAM 12.

In the case of image data, the signal processor 8 performs position computation, light source computation, and the like for characters in three-dimensional space, based on the commands from the CPU 7. Next, the image processor 9 performs writing and the like of image data to be rendered to the RAM 12, based on the computation results from the signal processor 8. The image data written to the RAM 12 are then provided to the D/A converter 17 via the interface circuit 13. The image data are converted to an analog video signal with the D/A converter 17. The image data are then provided to the television monitor 20 and displayed as images.

In the case of audio data, first, the signal processor 8 performs processing to generate and process audio data based on a command from the CPU 7. For example, processing to convert pitch, add noise, set an envelope, set the level, add reverb, and the like is performed for the audio data. Next, the audio data is output from the signal processor 8 and provided to the D/A converter 15 via the interface circuit 16. Here, the audio data are converted to an analog audio signal. The audio data are then output as sound from the speaker 13 via the amplifier circuit 14.

Various Functions in the Video Game Device

Figure 2:
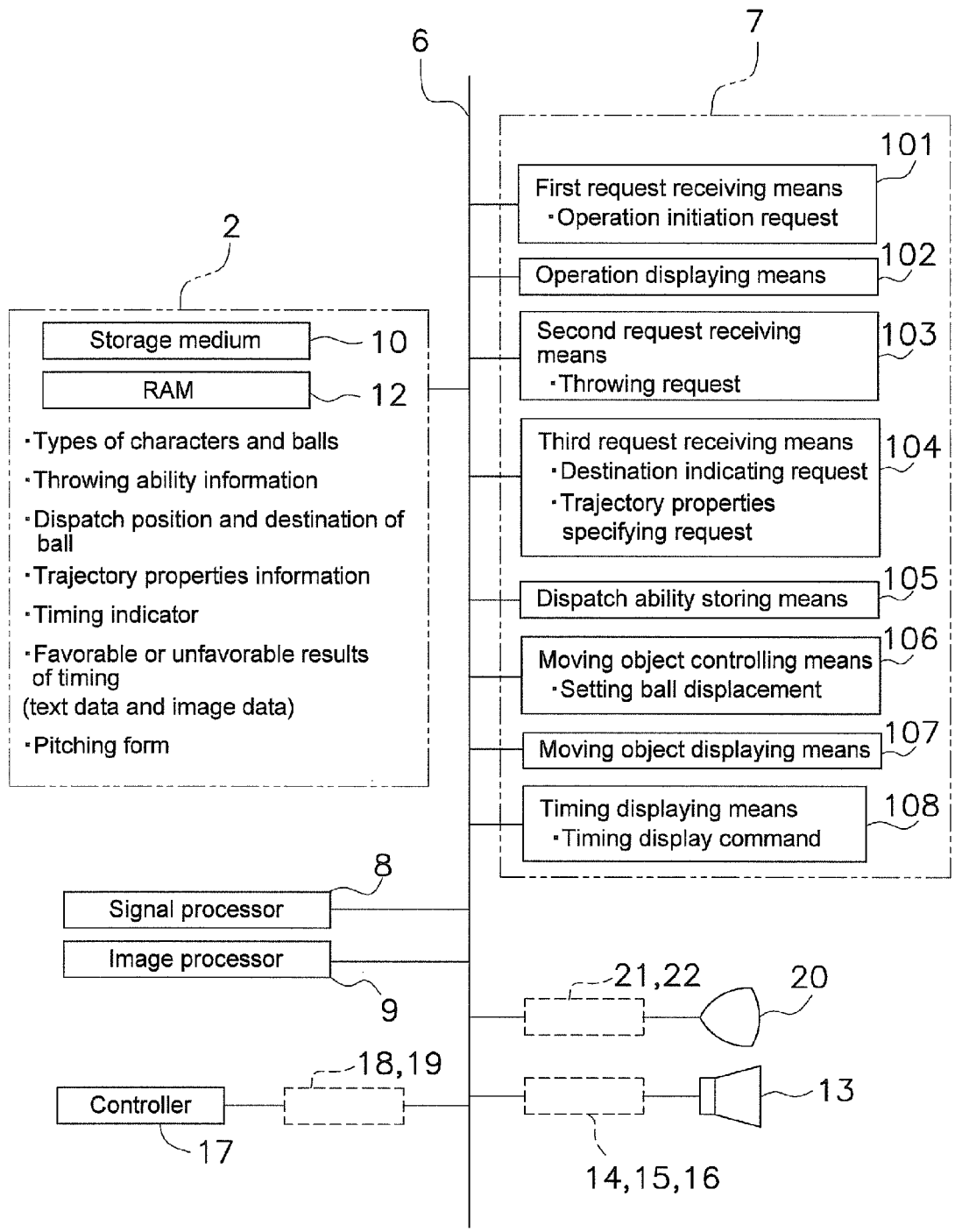
FIG. 2 is a functional block diagram that describes the principal functions of the CPU 7 shown in FIG. 1.

The video game executed in the video game device is, for example, a baseball video game with a pitcher's ball control controlling function. FIG. 2 is a functional block diagram for describing the functions of the CPU 7 shown in FIG. 1. The ball control controlling function of the baseball video game device, which plays an important role in this invention, is described using this functional block diagram.

The baseball video game device is a baseball video game device which displays the pitcher character and the ball on the television monitor 20, and in which a baseball video game, in which the ball is thrown by the pitcher character, can be executed with the controller 17. The baseball video game device comprises first request receiving means 101, operation displaying means 102, second request receiving means 103, third request receiving means 104, dispatch ability storing means 105, moving object controlling means 106, moving object displaying means 107, and timing displaying means 108.

The first request receiving means 101 is a means for receiving an operation initiation request from the controller 17 in order to cause the pitcher character to initiate the dispatch operation up to the point of dispatching the ball. In the first request receiving means 101, the CPU 7 is caused to recognize the operation initiation request from the controller 17 as a control command, whereby the pitcher character is caused to initiate the dispatch operation until the ball is dispatched.

The operation displaying means 102 is a means for displaying the dispatch operation of the pitcher character on the television monitor 20 when the first request receiving means 101 receives the operation initiation request. In the operation displaying means 102, when the operation initiation request from the controller 17 is recognized by the CPU 7 as a control command in the first request receiving means 101, the CPU 7 issues a command for the television monitor 20 to display the pitcher dispatch operation of the character. Based on the command from the CPU 7, the image data for the pitcher character is processed by the signal processor 8 and the image processor 9, the processed image data is provided from the RAM 12 to the television monitor 20, and the pitcher dispatch operation of the character is displayed as a moving image on the television monitor 20.

The second request receiving means 103 is a means for receiving the request to throw the ball from the controller 17, when the pitcher dispatch operation of the character is displayed on the television monitor 20 by the operation displaying means 102. In the second request receiving means 103, the request to throw the ball by operation of the controller 17 is recognized as a control command by the CPU 7, when the pitcher dispatch operation of the character is displayed on the television monitor 20 by the operation displaying means 102.

The third request receiving means 104 is a means for receiving the destination indicating request and trajectory properties specifying request from the controller 17, in order to indicate the destination and to specify the trajectory properties of the ball up to the destination, before the first request receiving means 101 receives the operation initiation request. In the third request receiving means 104, the destination and trajectory properties of the ball up to the destination can be specified, before the CPU 7 is caused to recognize the operation initiation request from the controller 17 as a control command in the first request receiving means 101. This is implemented by causing the CPU 7 to recognize the destination indicating request and the trajectory properties specifying request from the controller 17 as control commands.

The dispatch storing means 105 is a means for storing the throwing ability data of the pitcher character. In the dispatch storing means 105, the pitcher character's throwing ability data is read from the recording medium 10 and stored in the RAM 12, based on a command from the CPU 7.

The moving object controlling means 106 is a means for controlling the movement of the ball according to the timing at which the second request receiving means 103 received the throwing request. The moving object controlling means 106 references the throwing ability data stored in the dispatch storing means 105 and controls the movement of the ball. In addition, the moving object controlling means 106 controls the movement of the ball according to the destination indicating request and trajectory properties specifying request received from the third request receiving means 104. Furthermore, the moving object controlling means 106 sets the extent of the displacement of the ball at the destination thereof and controls the movement of the ball, according to the dispatch position of the moving object at the character, for the timing at which the second request receiving means 103 received the throwing request. In the moving object controlling means 106, the movement of the ball is controlled by the CPU 7, in accordance with the timing at which the request to throw the ball sent by the controller 17 was recognized as a control command by the CPU 7 in the second request receiving means 103. At this time, the moving object controlling means 106 causes the CPU 7 to reference the throwing ability data stored in the RAM 12 in the dispatch storing means 105 and causes the CPU 7 to control the movement of the ball. Also, the moving object controlling means 106 causes the CPU 7 to control the movement of the ball according to the destination indicating request and the trajectory properties specifying request recognized by the CPU 7 in the third request receiving means 104. Furthermore, with the moving object controlling means 106, the CPU 7 causes the signal processor 8 to compute the extent of the displacement of the ball at the destination of the ball and the CPU 7 is caused to control the movement of the ball, when the CPU 7 causes the ball to be dispatched from the pitcher character based on the throwing request recognized by the CPU 7 in the second request receiving means 103.

The moving object displaying means 107 is a means for displaying the ball, the movement of which is controlled by the moving object controlling means 106, on the television monitor 20. With this moving object displaying means 107, the movement of the ball controlled by the CPU 7 in the moving object controlling means 106 is processed as image data by the signal processor 8 and the image processor 9, the processed image data is provided to the television monitor 20 from the RAM 12, and the movement of the ball is displayed on the television monitor 20 as a moving image.

The timing displaying means 108 is a means for displaying the timing for dispatching the ball after the first request receiving means 101 has received the operation initiation request. With this timing displaying means 108, the timing for dispatching the ball is displayed with a timing indicator. In addition, the favorable or unfavorable results of the timing when the ball was dispatched are displayed with text or an image by the timing displaying means 108. With this type of timing displaying means 108, the CPU 7 issues a command to cause the timing for dispatching the ball to be displayed on the television monitor 20, after the operation initiation request sent from the controller 17 is recognized by the CPU 7 in the first request receiving means 101. Based on this command from the CPU 7, the timing for dispatching the ball is computed in real time by the signal processor 8. Based on the results computed in this way, image data corresponding to the timing indicator, and text or an image are written to the RAM 12 by the image processor 9. The timing indicator showing the timing for dispatching the ball and favorable or unfavorable results of the timing when the ball was dispatched are provided as image data to the television monitor 20 from the RAM 12 and displayed on the television monitor 20.

Figure 3:
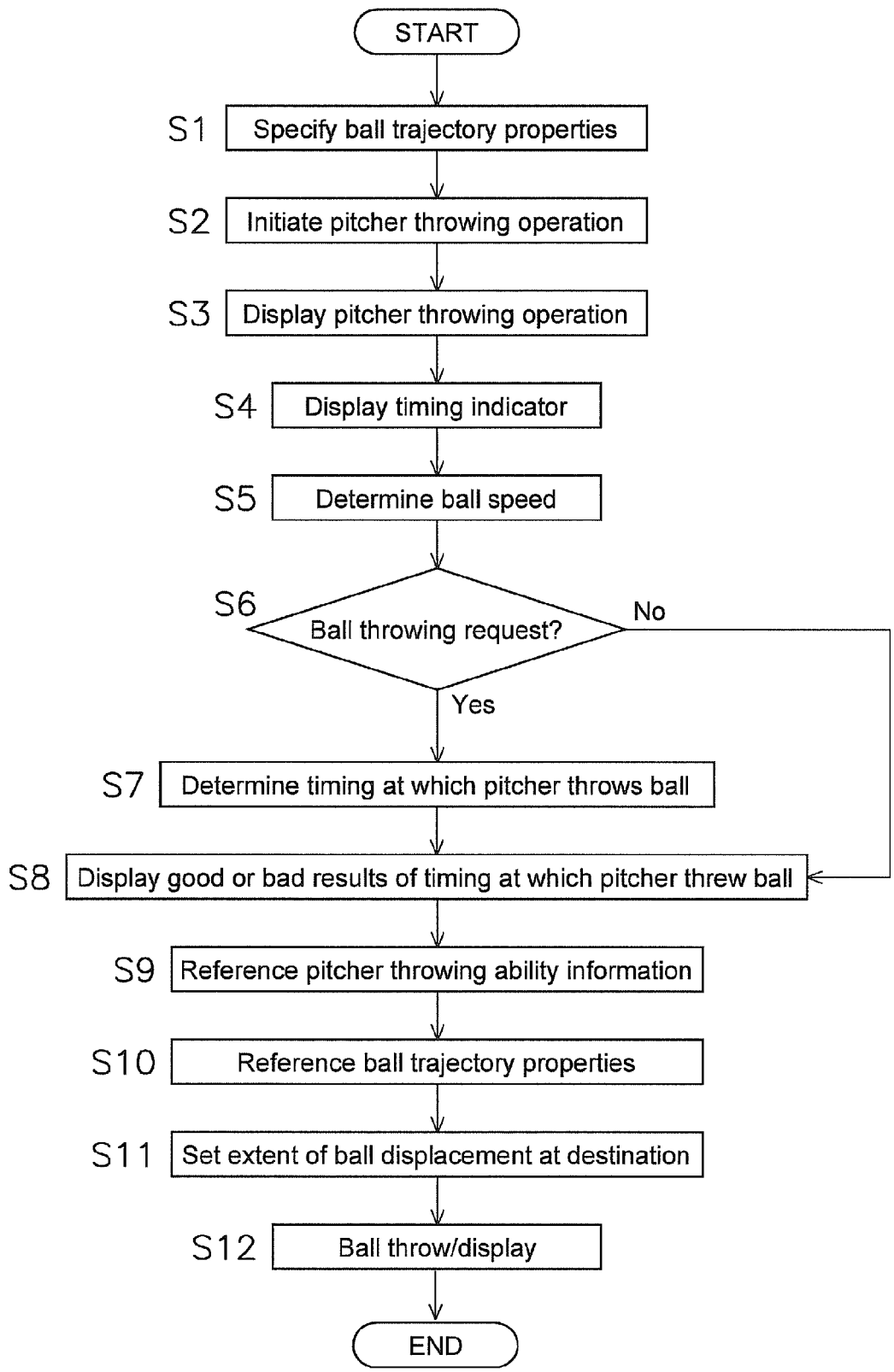
FIG. 3 is a flowchart showing the ball control controlling function for the pitcher in a baseball video game.

Overview of the Execution of the Pitcher's Ball Control Controlling Function in the Baseball Video Game An overview of the execution of the pitcher's ball control controlling function in the baseball video game in this embodiment is described using the flowchart shown in FIG. 3.

In a baseball video game which displays a pitcher character and a ball on a television monitor 20, and which causes a ball to be thrown by the pitcher character by means of a controller 17, the destination will first be indicated and the trajectory properties of the ball up to the destination will be specified in the third request receiving step (S1). Next, in the first request receiving step, the operation initiation request is provided to the pitcher character from the controller 17 and the pitcher character is caused to initiate a throwing operation (S2).

Thereupon, in the operation displaying step, the pitcher character's throwing operation is displayed on the television monitor 20 (S3). At this time, in the timing display step, the timing indicator for showing the timing for the pitcher character to throw the ball is displayed (S4). The speed of the ball is determined by operating the controller 17 (S5). In this state, when the pitcher character receives the throwing request from the controller 17 in the second request receiving step (S6), the timing at which the pitcher character throws the ball is determined (S7). Thereupon, in the timing display step, the favorable or unfavorable results of the timing at which the pitcher character throws the ball are displayed with text or an image (S8). Furthermore, the throwing ability data for the pitcher character in the dispatch storing step, and the trajectory properties which are specified in the third request receiving step, are referenced in the moving object controlling step (S9, S10). The extent of the displacement of the ball at the destination is then determined based on the throwing ability data and the trajectory properties, and according to the timing at which the pitcher character throws the ball (S11). Finally, the ball is dispatched from the pitcher character toward the destination and the dispatched ball is displayed on the television monitor 20 by the moving object displaying step (S12).

Overview of the Processing of the Ball Control Controlling Function of the Pitcher in the Baseball Video Game An overview of the processing of the ball control controlling function of the pitcher in the baseball video game is described below.

In the ball control controlling function of the pitcher in the baseball video game, the destination and trajectory properties indicated from the controller 17 in the third request receiving means 104 are recognized by a control unit 1 including the CPU 7 (S1). Then, in the first request receiving means 101, the operation initiation request indicated by way of the controller 17 is recognized by the control unit 1 (S2). Thereupon, in the operation displaying means 102, the command for the pitcher character's throwing operation to be displayed on the television monitor 20 is issued by the control unit 1 (S3). Based on the command from the control unit 1, the image data for the pitcher character is processed by the signal processor 8 and the image processor 9, the processed image data is provided from the RAM 12 to the television monitor 20, and the pitcher character's throwing operation is displayed as a moving image on the television monitor 20 (S3). At this time, in the timing displaying means 108, the timing for dispatching the ball is displayed on the television monitor 20 with the timing indicator (S4). When the controller 17 is operated, the control unit 1 can be caused to recognize the speed of the ball (S5). When the throwing operation of the pitcher character is displayed on the television monitor 20 in the operation displaying means 102, the control unit 1 is caused to recognize the ball throwing request in the second request receiving means 103 by operating the controller 17 (S6). Thereupon, in the timing displaying means 108, the timing at which the pitcher character throws the ball is recognized by the control unit 1 (S7).

The favorable or unfavorable results of the timing at which the pitcher character throws the ball are determined by the control unit 1 and displayed on the television monitor 20 with text or an image stored in the storage unit 2 (S8). Furthermore, in the moving object controlling means 106, the control unit 1 is caused to recognize the throwing ability data of the pitcher character stored in the storage unit 2 in the dispatch storing means 105 (S9). While the control unit 1 references the throwing ability data of the pitcher character and the trajectory properties recognized by the control unit 1 in the third request receiving means 104 (S9, S10), the extent of the displacement of the ball at the destination is computed and set by the control unit 1 according to the timing at which the pitcher character throws the ball (S11). Then, in the moving object displaying means 107, the image data for the ball is processed by the control unit 1, the processed image data is provided to the television monitor 20 from the storage unit 2, and the movement of the ball is displayed on the television monitor 20 as a moving image (S12).

Each of the means in the pitcher's ball control controlling function processed in this way are described below.

The first request receiving means 101 receives an operation initiation request from the controller 17 in order to cause the pitcher character to initiate the throwing operation up to the throwing of the ball. In this first request receiving means 101, the operation initiation request is received by the control unit 1 by pressing the third button 17c of the controller 17. The pitcher character is then caused to initiate the throwing operation and throw the ball.

The operation displaying means 102 displays the throwing operation by the pitcher character as a moving image on the television monitor 20. For the pitcher character displayed here, the pitching form is set for each pitcher character. The pitching forms include overhand throw, three-quarter, sidearm throw, underhand throw, and the like, for example, and these pitching forms are stored in the storage unit 2 and appropriately called from the storage unit 2.

Figure 4:
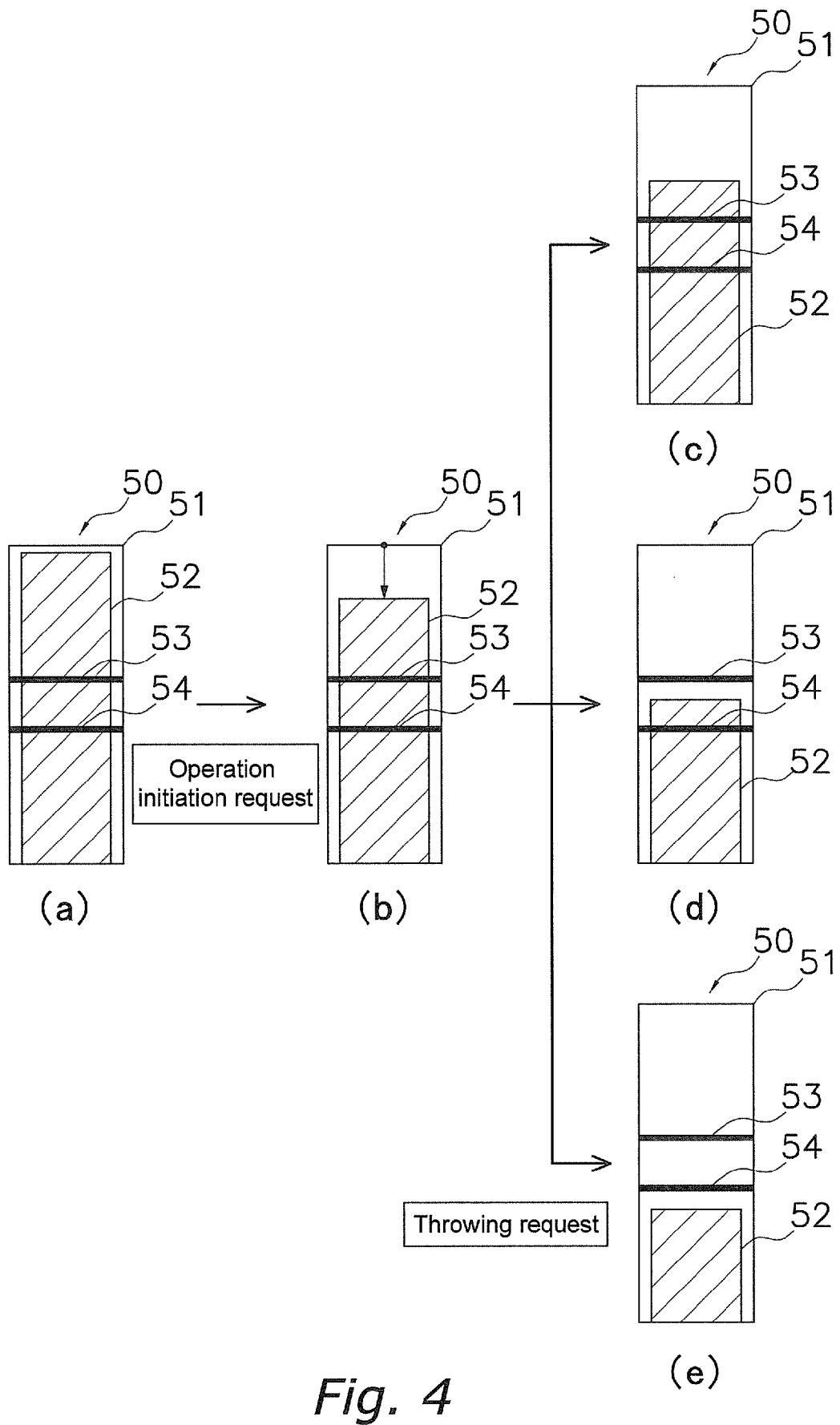
FIG. 4 is a diagram showing a timing indicator changing in conjunction with the pitcher's throwing operation.

The timing displaying means 108 displays the timing indicator 50 on the television monitor 20 in order to show the timing for throwing the ball, after the first request receiving means 101 has received the operation initiation request. The timing for the pitcher character to throw the ball can be determined with the timing indicator 50. The timing indicator 50 comprises, for example, a timing meter 51 which is long in a vertical direction, and a timing bar 52 whose length changes from top to bottom on the timing meter 51, as shown in FIG. 4. The timing meter 51 is a yardstick for measuring the timing at which the pitcher character is to release the ball. Horizontal lines 53, 54, for showing the optimal release point for the pitcher character, are placed at a prescribed vertical interval on the timing meter 51. The vertical interval at which the horizontal lines 53, 54 are placed is set according to the pitcher character's ball control. For example, when the pitcher character has superior ball control, the interval between the horizontal lines 53, 54 is set to be large; when the pitcher character has inferior ball control, the interval between the horizontal lines 53, 54 is set to be small.

The timing bar 52 is displayed on the timing meter 51, so as to operate in conjunction with the throwing operation of the pitcher character. This timing bar 52 is as shown in FIG. 4(a) and FIG. 4(b), for example. Once the pitcher character initiates the throwing operation, the timing bar 52 is shortened from top to bottom on the timing meter 51. Then, when the second request receiving means 103 discussed below receives the throwing request from the controller 17, the timing bar 52 stops. At this time, as shown in FIG. 4(c), when the timing bar 52 is in the upper portion of the timing meter 51 above the upper horizontal line 53, a state preceding the optimal state for release of the ball (early release state) is indicated. Also, as shown in FIG. 4(d), when the timing bar 52 is between the upper horizontal line 53 and the lower horizontal line 54 on the timing meter 51, a state in which the timing for the release of the ball is optimal (optimal release state) is indicated. Furthermore, as shown in FIG. 4 (e), when the timing bar 52 is in the lower portion of the timing meter 51 below the lower horizontal line 54, a state subsequent to that in which the timing for the release of the ball is optimal (late release state) is indicated. According to these various states (early release state, optimal release state and late release state), text or an image will be displayed on the television monitor 20 in the timing displaying means 108. For example, the text "Fast" is displayed in the early release state, the text "Good" in the optimal release state, and the text "Late" in the late release state.

The second request receiving means 103 receives the request to dispatch the ball from the controller 17, when the pitcher character's throwing operation is displayed on the television monitor 20 by the operation displaying means 102. When the throwing request is received in the second request receiving means 103, the extent of the displacement of the ball at the destination is set, and the movement of the ball to the destination is controlled in the moving object controlling means 106. The extent of the displacement of the ball at the destination is determined according to the pitcher character's release point when the ball is thrown from the pitcher character during the throwing operation. At this point, the direction in which the ball deviates from the destination is determined depending on the direction in which the arm moves in the pitching form of the pitcher character. For example, when the pitching form of the pitcher character is an overhand throw, the ball tends to deviate vertically at the destination. When the pitching form of the pitcher character is a sidearm throw, the ball tends to deviate to the left or right at the destination. Furthermore, when the pitching form of the pitcher character is a three-quarter, the ball tends to deviate at a 45 degree angle at the destination.

Figure 5:
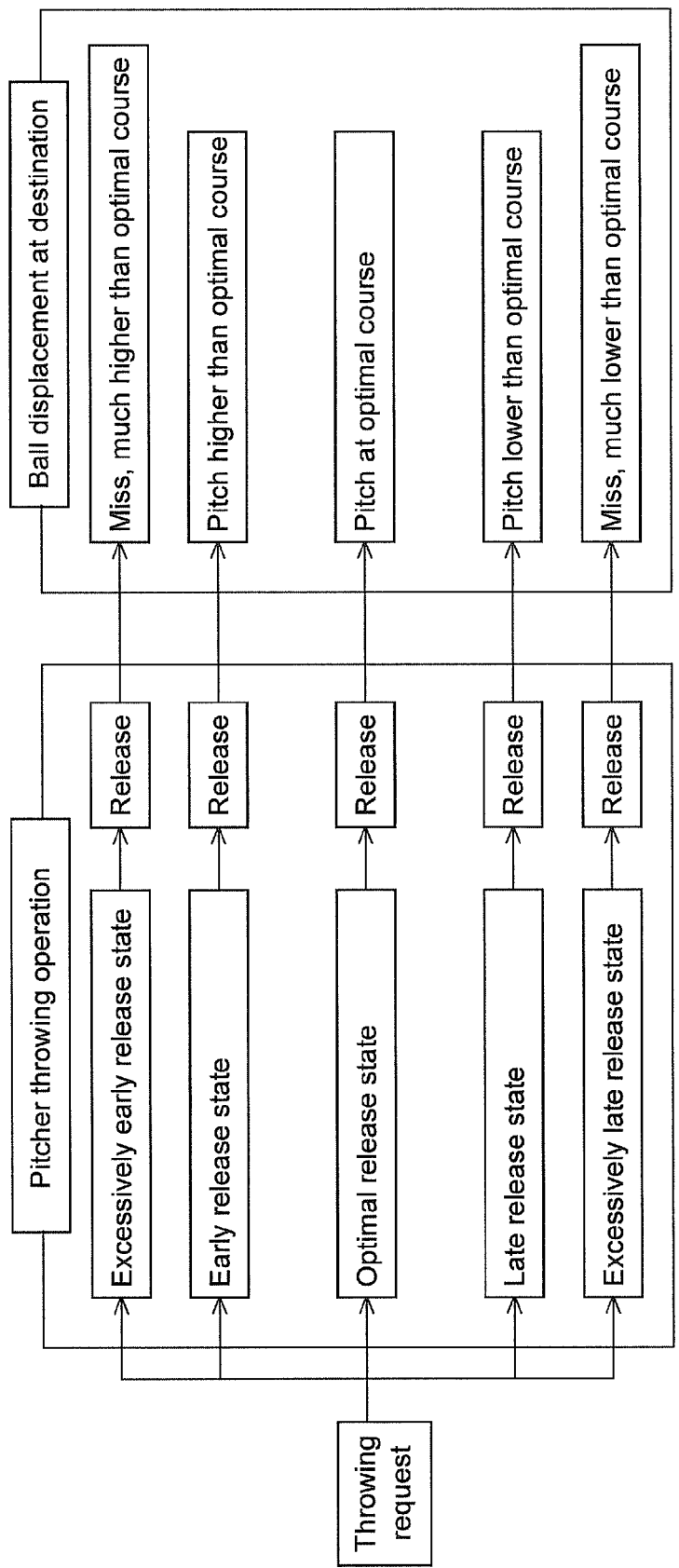
FIG. 5 is a diagram for describing the extent of the displacement of the ball at the destination according to the timing of the throwing request received during the pitcher's throwing operation.

The direction of the deviation of the ball at the destination is shown below for when the throwing request is received in the second request receiving means 103. For example, when the pitching form of the pitcher character is an overhand throw, as shown in FIG. 5, when the ball is released in the early release state, the ball is thrown higher than the destination specified in the third request receiving means 104 (optimal course). However, when the ball is released in the optimal release state, the ball is thrown on the optimal course. Furthermore, when the ball is released in the late release state, the ball is thrown displaced below the optimal course. Here, in the state in which the timing at which the ball was released is very early (excessively early release state), the ball is greatly displaced above the optimal course and misses. Also, in the state in which the timing at which the ball was released is very late (excessively late release state), the ball is displaced very far below the optimal course and misses. Note that when the throwing request was not received in the second request receiving means 103, the excessively late release state results and in this case, the ball is likewise displaced very far below the destination and misses.

In the third request receiving means 104, the destination to which the pitcher character throws the ball and the trajectory properties of the ball as far as the destination can be specified. The destination of the ball specified at this time is in the vicinity of the catcher character, for example. The vicinity of the catcher character shown here is the ball placement when the pitcher character throws the ball to the catcher character. The ball placement can be specified with the up key 17U, the down key 17D, the left key 17L, and the right key 17R on the controller 17, for example. In addition, the trajectory properties include pitches such as a straight, two-seam fastball, four-seam fastball, slider, fast slider, cut fastball, curve, slow curve, drop curve, S slider, fork ball, palm, knuckleball, V-slider, change-up, split-fingered fastball, circle change, sinker, screw, fast sinker, fast screw, circle change, shoot, fast shoot, and the like. These trajectory properties can be specified with the up key 17U, the down key 17D, the left key 17L, and the right key 17R on the controller 17, for example; the type of pitch specified is recognized by the control unit 1. Note that the extent of the displacement of the ball at the destination described for the second request receiving means 103 is influenced by the trajectory properties as well. When the ball is not released in the optimal release state, the extent of the displacement of the ball at the destination becomes larger according to the trajectory properties of the ball, for example in the order of: straight, slider, shoot, curve, fork ball, sinker.

The pitcher character's throwing ability data can be stored by the dispatch storing means 105. The pitcher character's throwing ability data includes information relating to the ball control of the pitcher character, for example. The information relating to the pitcher character's ball control varies depending on the circumstances during the pitch. The circumstances during the pitch in which the ball control of the pitcher character is varied include the number of runners on base, the highs and lows of the batter's batting average, the handedness of the batter, the highs and lows of the batting average in past games, and the ability of the catcher. Note that the pitcher character's throwing ability data influences the extent of the displacement of the ball at the destination described in the second request receiving means 103. For example, in the information relating to ball control included in the pitcher character's throwing ability data, the extent of the displacement of the ball at the destination decreases if the pitcher character has superior ball control. The extent of the displacement of the ball at the destination increases easily if the pitcher character has inferior ball control.

Other Embodiments (a) In the previous embodiment, an example using a home video game device was shown. However, video game devices can be similarly applied to video game devices for commercial use in which the monitor is integrated, and to personal computers, workstations, or the like, which function as video game devices by executing video game programs, and are not limited to the previous embodiment.

(b) In the previous embodiment, an example using a baseball video game was shown. However, the video game may be any type of game, so long as it is a video game in which ball control can be controlled, without being limited to the previous embodiment. For example, the present invention can also be applied to a soccer game or the like, as an example of a video game in which ball control can be controlled.

(c) In the previous embodiment, an example in which a timing indicator is displayed in conjunction with a pitcher character's throwing operation is shown; however, the timing indicator does not necessarily have to be displayed. For example, when the timing indicator is not displayed, the player causes the pitcher character to release the ball at the timing determined by the player to be optimal, while observing the pitcher character's throwing operation; and thereby the extent of the displacement of the ball at the destination is determined and the movement of the ball is controlled.

INDUSTRIAL APPLICABILITY

In this invention, when the dispatch operation of the character is displayed on the monitor, the dispatch request to dispatch the moving object is received from the controller in the second request receiving function. According to the timing at which the second request receiving function received the dispatch request, the movement of the moving object is controlled by the moving object control function. Thereby, the player can control the movement of the moving object during the character's moving object dispatch operation and can experience nervousness and a sense of realism when causing the character to dispatch a moving object.

What is claimed is:

1. A non-transitory computer readable medium storing a video game program that causes a computer to implement a video game that is executed by means of a controller, in which a character and a moving object are displayed on a monitor, and the moving object is dispatched by the character having a dispatching form that is a posture of the character at a point of dispatching the moving object, the video game program comprising:

code programmed to receive an operation initiation request from the controller in order to cause the character to initiate a dispatch operation until the moving object is dispatched;

code programmed to display the dispatch operation of the character on the monitor when the operation initiation request is received;

code programmed to receive a request to dispatch the moving object from the controller when the dispatch operation of the character is continuously displayed on the monitor;

code programmed to set the point of dispatching the moving object from the character according to a timing at which the dispatch request is received, and to set deviance in a trajectory of the moving object between the point and a destination based on the dispatching form of the character wherein the moving object is controlled to move from the point to the destination on the basis of the deviance;

code programmed to display the moving object controlled on the monitor;

the code programmed to set the point of dispatching the moving object including code programmed to control the deviation of the moving object in the trajectory on the basis of the dispatching form of the character, and controlling the point of dispatching the moving object when the dispatch operation of the character is continuously displayed on the monitor.

2. The non-transitory computer readable medium storing the video game program according to claim 1, further comprising code programmed to receive a destination indicating request and a trajectory properties specifying request from the controller in order to indicate the destination and to specify the trajectory properties of the moving object up to the destination, before the operation initiation request is received; wherein the movement of the moving object is controlled according to the destination indicating request and trajectory properties specifying request received.

3. The non-transitory computer readable medium storing the video game program according to claim 1, further comprising code programmed to store dispatch information for the character, wherein the code programmed to set the point of dispatching the moving object from the character includes code programmed to reference the dispatch information stored and to control the movement of the moving object.

4. The non-transitory computer readable medium storing the video game program according to claim 1, wherein the code programmed to set the point of dispatching the moving object from the character includes code programmed to establish the deviation of the moving object in the trajectory and to control the movement of the moving object, in accordance with the dispatch position of the moving object at the character at the time at which the dispatch request is received.

5. The non-transitory computer readable medium storing the video game program according to claim 1, further comprising code programmed to display a timing indicator that shows the timing at which the moving object is to be dispatched, after the operation initiation request is received.

6. The non-transitory computer readable medium storing the video game program according to claim 5, wherein the timing indicator is displayed in conjunction with the dispatch operation of the character.

7. The non-transitory computer readable medium storing the video game program according to claim 1, further comprising code programmed to display, with text or an image, favorable or unfavorable results of the timing at which the moving object was dispatched.

8. The non-transitory computer readable medium storing the video game program according to claim 1, wherein the speed of the moving object is determined by operating the controller from when the operation initiation request is received until when the dispatch request is received.

9. The non-transitory computer readable medium storing the video game program according to claim 1, wherein the character has an ability in dispatching, and the code programmed to set the point of dispatching the moving object includes code programmed to control the deviation of the moving object in the trajectory on the basis of the dispatching form of the character, and to control the point of dispatching the moving object when the dispatch operation of the character is continuously displayed on the monitor by the operation display function, and the ability.

10. The non-transitory computer readable medium storing the video game program according to claim 9, wherein the video game is a baseball video game, the character is a pitcher in the baseball video game, the moving object is a ball of the baseball video game, and the ability is a kind of pitch which the pitcher throws.

11. A video game method that executes, by means of a controller, a video game in which a character and a moving object are displayed on a monitor, and the moving object is dispatched by the character being with a dispatching form that is a posture of the character at a point of dispatching the moving object, the video game method comprising:

receiving an operation initiation request from the controller in order to cause the character to initiate a dispatch operation until the moving object is dispatched;

displaying continuously the dispatch operation of the character on the monitor when the operation initiation request has been received;

receiving a request to dispatch the moving object from the controller when the dispatch operation of the character is continuously displayed on the monitor;

setting the point of dispatching the moving object from the character according to a timing at which the request to dispatch has been received;

setting a deviance in a trajectory of the moving object between the point and a destination based on the dispatching form of the character wherein the moving object is controlled to move from the point to the destination on the basis of the deviance; and displaying the moving object controlled by the moving object control function on the monitor, the setting the movement of the moving object includes controlling the deviation of the moving object in the trajectory on the basis of the dispatching form of the character, and controlling the point of dispatching the moving object when the dispatch operation of the character is continuously displayed on the monitor.

* * * * *